US006929815B2

(12) United States Patent
Bengs et al.

(10) Patent No.: US 6,929,815 B2
(45) Date of Patent: Aug. 16, 2005

(54) METHOD OF INCREASING THE α-AMYLASE-RESISTANT STARCH CONTENT (RS CONTENT) OF A POLYSACCHARIDE, POLYSACCHARIDES, THE USE THEREOF AND FOOD CONTAINING SAID POLYSACCHARIDES

(75) Inventors: Holger Bengs, Frankfurt am Main (DE); Gisela Jacobasch, Wandlitz (DE); Detlef Schmiedl, Berlin (DE)

(73) Assignee: Celanese Ventures GmbH, Frankfurt (DE)

( * ) Notice: Subject to any disclaimer, the term of this patent is extended or adjusted under 35 U.S.C. 154(b) by 60 days.

(21) Appl. No.: 10/149,185

(22) PCT Filed: Dec. 9, 2000

(86) PCT No.: PCT/EP00/12459

§ 371 (c)(1),
(2), (4) Date: Oct. 25, 2002

(87) PCT Pub. No.: WO01/42309

PCT Pub. Date: Jun. 14, 2001

(65) Prior Publication Data

US 2003/0094172 A1 May 22, 2003

(30) Foreign Application Priority Data

Dec. 10, 1999 (DE) .......................................... 199 59 863

(51) Int. Cl.$^7$ ............................... A23L 1/05; C13K 1/06
(52) U.S. Cl. ........................ 426/578; 426/661; 127/38; 127/71; 536/102
(58) Field of Search ................................. 426/578, 661; 127/38, 71; 536/102

(56) References Cited

U.S. PATENT DOCUMENTS

| 5,593,503 | A  | * | 1/1997  | Shi et al. ...................... 127/71 |
| 5,855,946 | A  | * | 1/1999  | Seib et al. ................... 426/549 |
| 5,902,410 | A  | * | 5/1999  | Chiu et al. ..................... 127/71 |
| 6,623,943 | B2 | * | 9/2003  | Schmiedel et al. ............ 435/98 |
| 6,664,389 | B1 | * | 12/2003 | Shi et al. ..................... 536/102 |
| 6,696,563 | B2 | * | 2/2004  | Bengs et al. ............ 536/123.12 |

FOREIGN PATENT DOCUMENTS

| EP | 0 688 872       | 12/1995 |
| EP | 0 747 397 A2 *  | 12/1996 |
| WO | 00/02926        | 1/2000  |
| WO | 00/55209        | 9/2000  |

* cited by examiner

Primary Examiner—N. Bhat
(74) Attorney, Agent, or Firm—Hamilton, Brook, Smith & Reynolds, P.C.

(57) ABSTRACT

The invention relates to a process for increasing the content of α-amylase-resistant starch (RS content) of a polysaccharide wherein
the polysaccharide used is, under a water deficit, incubated,
then cooled,
if appropriate dried and
a polysaccharide having an RS content increased compared with the polysaccharide used is obtained.

36 Claims, No Drawings

METHOD OF INCREASING THE α-AMYLASE-RESISTANT STARCH CONTENT (RS CONTENT) OF A POLYSACCHARIDE, POLYSACCHARIDES, THE USE THEREOF AND FOOD CONTAINING SAID POLYSACCHARIDES

RELATED APPLICATIONS

This application is the U.S. National Stage of International Application No. PCT/EP00/12459, filed Dec. 9, 2000, published in German, and claims priority under 35 U.S.C. § 119 or 365 to German Patent Application No. 199 59 863.0, filed Dec. 10, 1999.

The use of resistant starches (RS) has been gaining greater importance for the food industry. The breakdown of RS products produces only a small amount of energy for the organism. This energy supply is predominantly due to the oxidative breakdown of absorbed short-chain fatty acids from the large intestine. These short-chain fatty acids are end products of the carbohydrate metabolism of intestinal microflora. The intake of RS-containing foods links two functions; provision of substrate for the energy metabolism of intestinal microflora and that of the large intestine epithelial cells. The latter, to maintain their structure and function, are dependent on a luminal supply of short-chain fatty acids, in particular butyrate, are dependent on a luminal supply of short-chain fatty acids, in particular butyrate.

It has long been known that the content of branched amylopectin in starches which usually consist of amylose and amylopectin in varying composition is decreased by specific enzymatic treatment, as a result of which the content of short-chain amylose structures can be increased (U.S. Pat. No. 3,729,380). It is also known that such products have a greater tendency toward retrogradation than native starches. In this retrogradation process, what are termed α-amylase-resistant starch structures develop. Resistant starch (RS) is defined as carbohydrate polymers which are not broken down by α-amylase. As a result they are reduced-energy bulking components in food compositions within the meaning of dietary fiber. Treatment with debranching enzymes, for technical reasons, usually takes place in a not excessively concentrated aqueous starch paste.

EP 0 564 893 A1 describes and claims a process for producing an RS product which contains up to 15% RS. In this process the aqueous suspension of a starch which contains at least 40% amylose is gelatinized and enzymatically debranched by treatment with an enzyme which cleaves the α-1,6-glycosidic bonds, and the resultant intermediate product is then retrograded. According to EP 0 564 893 A1 the optimum starch concentration in the suspension is 15% and the examples in this EP patent application illustrate the process when the starch concentration is either reduced to 14% or increased to 17%. The starting material contains at least 40% amylose and is a corn starch. It is further shown that at an amylose content of 25%, no resistant starch (RS) is formed by this process. Furthermore, it has been found that if the amylose content is increased above 40% to up to 100%, a product can be produced which contains up to 50.3% RS.

EP 0 688 872 A1 describes and claims a process for producing an RS-containing product which contains 25 to 50% by weight of RS. In accordance with the claims, EP 0 688 872 A1 describes and claims a process for producing an RS-containing product in which an aqueous suspension of a partially degraded gelatinized starch is enzymatically debranched and the intermediate product is retrograded.

(In this context, a "partially degraded starch" is taken to mean a polymer which has been reduced in molecular weight by suitable treatment, with the chain-length shortening affecting both the amylose and also the amylopectin. The degradation includes not only hydrolysis processes (acid- or enzyme-catalyzed) but also extrusion, oxidation or pyrolysis.)

Particular stress is laid on acid-degraded root or tuber starches and on maltodextrins of root or tuber starches. Maltodextrins are characterized by a DE value (DE: dextrose equivalent) in the range from 1 to 19. They are produced from potato or tapioca starch which have amylose contents up to 25%. The aqueous suspension of such maltodextrins has a solids content of 20% by weight or more for the process. The maltodextrins are further characterized by high contents, of up to 22% by weight, of oligomers having degrees of polymerization less than 10 (DP<10), and a mean molecular weight of $1.3680 \times 10^4$ g/mol. The debranching enzymes which are used for the known process are pullulanase and isoamylase. At the end of the enzymatic treatment, retrogradation is carried out in a temperature range from 0 to 30° C. in a time period of 1 to 3 days, in which the aqueous reaction product is allowed to stand. The product is then spray-dried. A pulverulent product is prepared having an RS content up to a maximum of 60% by weight.

DE 198 29 240.6 describes α-amylase-resistant polysaccharides which are obtainable by a process which comprises the following steps:

a) preparing a suspension or dispersion of water-insoluble poly-(1,4-α-D-glucans) and water;

b) heating the suspension or dispersion;

c) cooling the resultant paste and retrograding the paste at a temperature which is lower than the temperature of the heated paste; and d) if appropriate drying the resultant product.

The description of the invention serves the purpose of producing carbohydrate polymers having a high content of resistant relatively thermally stable structures even more economically in order to be able to use them in food manufacture, for instance.

In the context of the present invention, RS content is taken to mean the content of α-amylase-resistant polysaccharides, as can be determined by the method of Englyst et al. (Classification and measurement of nutritionally important starch fractions, European Journal of Clinical Nutrition, 46 (Suppl. 23) (1992) 33–50); see also example 3.

The term "high RS content" is taken to mean an RS content of at least 25%, preferably 65 to 75%, 75 to 88%, 88 to 90%, 90 to 95% and, in particular, 95 to 99% by weight or more.

The term "water-insoluble" is taken to mean compounds which, according to the definition of the Deutsches Arzneimittelbuch [German pharmacopeia] (Wissenschaftliche Verlagsgesellschaft/Stuttgart & Gori-Verlag/Frankfurt, 9th edition, 1987; see also examples 4 to 5) come under the category "slightly soluble" compounds, "very slightly soluble" or "practically insoluble" compounds.

Those skilled in the art are familiar with the terms "suspension" and "dispersion". In addition, reference may be made to Römpp, Chemie-Lexikon [Römpp's chemistry lexicon], 9th edition, Thieme-Verlag, Stuttgart & New York, pages 4401 and 1010.

Those skilled in the art are also familiar with the term "paste". In addition, reference may be made to Römpp, Chemie-Lexikon [Römpp's chemistry lexicon], 9th edition, Thieme-Verlag, Stuttgart & New York, page 2256.

Regarding differential scanning calorimetry (DSC), see Gruchala & Pomeranz in Cereal Chemistry, 70 (1993) 163–170.

According to one embodiment, the invention relates to a process for increasing the content of α-amylase-resistant starch (RS content) of a polysaccharide which comprises the polysaccharide used being, under a water deficit, incubated,
then cooled,
if appropriate dried and
a polysaccharide having an RS content increased compared with the polysaccharide used being obtained.

In the inventive process the incubation can be performed once or several times.

In addition, in the inventive process, the process can be carried out at a water content of ≦50%, and in particular ≦35% (weight/weight), based on the total weight of polysaccharide and water.

In addition, in the inventive process, the incubation can be carried out at an established water deficit at a temperature $T_{process}$ which is above the glass transition temperature $T_G$ and is below the transformation temperature $T_{transf}$ ($T_G < T_{process} < T_{transf}$), in which case the temperature $T_{process}$ can vary during the incubation within said range.

In addition, in the inventive process, the transformation temperature $T_{transf}$ can be the mean decomposition temperature of the polysaccharide used: $T_{transf} = T_{decomposition}$.

In addition the inventive process can comprise the following
(i) the temperature $T_{process}$ is a temperature which
    is lower than the DSC end temperature $T_c$ (end temperature $T_c$ of differential scanning calorimetry) and/or
    is lower than the DSC peak temperature $T_p$ and/or
    is lower than the DSC onset temperature $T_o$, in which case
(ii) if appropriate the transformation temperature $T_{transf}$ is equal to the DSC end temperature $T_c$ or the DSC peak temperature $T_p$ or the DSC onset temperature $T_o$.

In addition, in the inventive process, for drying, spray-drying or freeze-drying can be carried out.

In addition, in the inventive process, a poly-(1,4-α-D-glucan) can be used.

In addition, in the inventive process, the starting material used can be water-insoluble poly-(1,4-α-D-glucans) which have been produced from biotransformation, from reaction with enzymes or from reaction of sucrose with an enzyme having the enzymatic activity of an amylosucrase.

In the embodiments of the inventive process, the starting material used can be poly-(1,4-α-D-glucans) which have been produced from biotransformation, from reaction with enzymes or from reaction with sucrose with an enzyme having the enzymatic activity of an amylosucrase; see for example WO 95 31 553.

Amylosucrase is taken to mean an enzyme which catalyzes the following reaction:

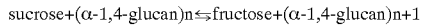

sucrose+(α-1,4-glucan)n ⇌ fructose+(α-1,4-glucan)n+1

On the basis of this reaction formula, linear oligomeric or polymeric α-1,4-glucans can act as acceptors for a chain-extending reaction which leads to water-insoluble poly-(1,4-α-D-glucans), the glucose radicals of which are linked by α-1,4-glycosidic bonds and which have a molecular weight in the range from $0.75 \times 10^2$ g/mol to $10^7$ g/mol.

The linear oligomeric or polymeric acceptors here can either be added from external sources, but they can also, as described in example 1, be produced from sucrose by the amylosucrase itself.

α-1,6-glycosidic bonds cannot be detected in these products by $^{13}$C-NMR (Remaud-Simeon et al. in Carbohydrate bioengineering (ed. S. B. Petersen et al.), Elsevier Science B.V. (1995), 313–320).

Water-insoluble poly-(1,4-α-D-glucans) which have the abovedescribed properties but which have been produced in a different manner can be starting materials of the inventive process.

In a further preferred embodiment of the inventive process, the starting materials used are water-insoluble poly-(1,4-α-D-glucans) which can be produced by reaction of sucrose with an enzyme having the enzymatic activity of an amylosucrase, using branched polysaccharide acceptors, for example glycogen, amylopectin, dextrin. The amylosucrase catalyzes an α-1,4-glucan chain extension on these branched polysaccharide acceptors. The resultant water-insoluble poly-(1,4-α-D-glucans) have a lower degree of branching compared with the branched polysaccharide acceptors used. In the context of the present invention, these products are also termed poly-(1,4-α-D-glucans).

Such water-insoluble poly-(1,4-α-D-glucans) which have the above-described properties but which have been produced in a different manner can also be starting materials of the inventive process.

In addition, in the inventive process, the poly-(1,4-α-D-glucans) can be chemically modified in a manner known per se.

Hence the poly-(1,4-α-D-glucans) can have been chemically modified by etherification or esterification in the 2, 3, or 6 position. Those skilled in the art are sufficiently familiar with chemical modification; see, for example, the literature below:
1. Functional properties of food components, 2nd edition, Y. Pomeranz, Academic Press (1991).
2. Lehrbuch der Lebensmittelchemie [Textbook of food chemistry], Belitz & Grosch, Springer Verlag (1992).
3. Citrate Starch Possible Application as Resistant Starch in Different Food Systems, B. Wepner et al., European Air Concerted Action, Abstract: air3ct94-2203, Functional Properties of Non-digestible Carbohydrates, Pro Fibre symposium, Lisbon, February 1998, page 59.

In addition, in the inventive process, the poly-(1,4-α-D-glucan) can have a degree of branching in the 6 position of a maximum of 0.5%.

In addition, in the inventive process, the poly-(1,4-α-D-glucan) can have a degree of branching in the 2 and/or 3 position of in each case a maximum of 1.0%, and in particular a maximum of 0.5%.

In addition, in the inventive process, the poly-(1,4-α-D-glucan) can have a molecular weight of $0.75 \times 10^2$ to $10^7$, preferably $10^3$ to $10^6$, and preferably $10^3$ to $5 \times 10^5$ g/mol.

In addition, in the inventive process, the water-insoluble poly-(1,4-α-D-glucans) may have neither been debranched, in particular have neither been enzymatically debranched, nor have been decreased with respect to their chain length (and thus with respect to their molecular weight), in particular not by enzyme catalysis, acid catalysis, extrusion, oxidation or pyrolysis.

Finally, in the inventive process, a starchy polysaccharide having a water solubility of class 6 to 7 in accordance with DAB can be produced (cold water insoluble).

According to a further embodiment, the invention relates to a starchy polysaccharide which is obtainable by the inventive process.

In addition the invention relates to a polysaccharide having a high content of (α-amylase-resistant starch (RS content) in which its RS content and/or its content of crystal type A decreases when the polysaccharide is incubated under a water deficit, in particular at a water content>50% and especially >35% (weight/weight).

The inventive polysaccharide has a characteristic ratio of crystal type A or crystal type B which is set, for example, in accordance with the inventive process which operates with a water deficit, so that it is understandable that the content of crystal type A decreases when the inventive polysaccharide is incubated with a water excess.

According to a further embodiment, the invention relates to a use of an inventive polysaccharide for food precursors or foods.

According to a further embodiment, the invention relates to a use of an inventive polysaccharide as a food additive.

According to a further embodiment the invention finally relates to a food precursor or food which has a content of an inventive polysaccharide.

EXAMPLE 1

Biotransformation 5 l of a sterilized 30 percent sucrose solution were placed in a 5 l vessel. An enzyme extract which contained an amylosucrase from Neisseria polysaccharea (see WO 95 31 553) was added to a portion and mixed. The enzyme activity used was 148 000 units in this experiment. The sealed vessel was incubated at 37° C. During the biotransformation period, a white precipitate formed. The reaction was terminated after 39 h. The precipitate was centrifuged off, frozen at −70° C. and then freeze-dried. The mass of freeze-dried solids was 526.7 g (70.2% yield).

To separate off low-molecular-weight sugars, 200 g of the solids were washed with water at room temperature for 30 min with stirring, frozen at −70° C. and freeze-dried. The fructose and sucrose contents, after the solids were dissolved in DMSO, were determined by a coupled enzymatic assay as described by STITT et al. (Meth. Enzym., 174 (1989) 518–552) and was 4.61 mg of fructose per 100 mg of solids (4.6%). The sucrose content was below the limit of detection.

The supernatant of the biotransformation was denatured at 95° C. After cooling to room temperature, it was again centrifuged. The clear supernatant was frozen at −70° C. and thawed at 4° C. over 3 days. The precipitate thus produced was frozen at −70° C. and freeze-dried.

To separate off low-molecular-weight sugars, 39.5 g of the solids were washed at room temperature with water for 30 min with stirring, frozen at −70° C. and freeze-dried. The fructose and sucrose contents, after dissolving the solids in DMSO, were determined by said coupled enzymatic assay and was 2.27 mg of fructose per 100 mg of solids. The sucrose content was below the limit of detection.

EXAMPLE 2

Starting Material

Determination of the molecular weight of the water-insoluble poly-(1,4-α-D-glucan) from example 1 synthesized by amylosucrase 2 mg of the poly-(1,4-α-D-glucan) from example 1 were dissolved at room temperature in dimethyl sulfoxide (DMSO, analytical grade from Riedel-de-Haen) and filtered (2 μm). A portion of the solution was injected into a gel-permeation chromatography column. The eluent used was DMSO. The signal intensity is measured using an RI detector and is evaluated against pullulan standards (from Polymer Standard Systems). The flow rate is 1.0 ml per minute.

The measurement found a number-average molecular weight ($M_n$) of 2 326 g/mol and a weight-average molecular weight ($M_w$) of 3 367 g/mol. The recovery rate is 100%.

EXAMPLE 3

Example of determination of RS content 200 mg (dry weight) of a pulverulent product to be analyzed for its RS content were incubated, to determine the RS content by the method of Englyst et al. (Eur. J. Clin. Nutrition, 46 (1992) (Suppl. 2) p. 33–550) at pH 5.2 for 120 min with the enzyme mixture described. After completion of enzymatic degradation, the enzyme activity was stopped by decreasing the pH to a value of 3 and the temperature to 20° C. Then, by adding 4 times the amount of ethanol, the mixture was set to 80% (v/v) ethanolic solution. The 80 percent ethanolic solution was allowed to stand for 1 h at room temperature. The precipitate was centrifuged (2 500× g, 10 min) and the supernatant was discarded. The residue was washed three times with 80 percent (v/v) ethanol and once with absolute ethanol and centrifuged. The residue was lyophilized and weighed. The carbohydrate content of the residue was determined and the RS content was calculated using the equation below:

$$RS[\%] = 100 \times \text{carbohydrate content/weight (dry weight)}$$

EXAMPLE 4

Determination of the solubility of polysaccharides and classification according to the Deutsche Arzneimittelbuch [German pharmacopeia] (DAB)

564 mg of poly-(1,4-α-glucan) (see example 1) were heated in approximately 0.5 l of twice-distilled water at 1.3 bar and 130° C. for 1.5 hours in an autoclave (Certoclav apparatus). The weight of the reaction vessel had been determined in advance. The apparatus was then depressurized and cooled at room temperature. The contents were weighed. This corresponded to 501.74 g. After a further 24 hours, the product was centrifuged and decanted. The solid residue was dried and weighed. This gave 468 mg. From this was calculated a dissolved content of 96 mg. Based on the solvent used, it was calculated therefrom that 5 226 mg of water were required for 1 mg of poly-(1,4-α-glucan). In accordance with the classification of the German pharmacopiea, this gave therefrom the classification that this substance is "very slightly soluble", since between 1 000 and 10 000 parts of solvent were necessary to dissolve 1 part of substance. This corresponded, of the 7 classes for classifying solubility (from "very soluble" (class 1) to "practically insoluble" (class 7)), to class number 6.

EXAMPLE 5

Determination of the solubility of polysaccharides and classification according to the German pharmacopeia (DAB)

The experiment was carried out as in example 4. The sole difference was a cooling process which was provided after the autoclave treatment and cooling to room temperature. The mixture of substances was kept at 5° C. for 3 hours.

526 mg of poly-(1,4-α-glucan) was weighed out into approximately 480 ml of twice-distilled water. After the thermal treatment the weight was 468.09 g. The dried sediment was 488 mg. Therefore, 38 mg of the poly-(1,4-α-glucan) had dissolved. This corresponded to a ratio of 1 mg of substance to 12 305 parts of solvent. Therefore, the substance after this treatment method was to be classified in class number 7 according to the DAB system and therefore regarded as practically insoluble, because more than 10 000 parts of solvent were required for 1 part of substance.

EXAMPLES 6 to 9

Polyglucans were prepared as starting materials in accordance with example 1 (samples 275, 283, 291 and 292). They were prepared by molecular weight buildup (synthesis using amylose-succrace in sucrose, precipitation polymerization).

Thermal analysis (DSC) of the polyglucan of example 6 (sample 275; see also DE 198 30 618.0) showed that the product is characterized by three conversions.

Region 1 is characterized by $T_o$=85.9; $T_p$=97.9; $T_c$=101.1° C., dH=1.7 mJ/mg.

Region 2 is characterized by $T_o$=111.8; $T_p$=126.1; $T_c$=133.9° C., dH=4.0 mJ/mg.

Region 3 is characterized by $T_o$=138.1; $T_p$=157.6; $T_c$=172.5° C., dH=23.0 mJ/mg.

Owing to the second and third regions, the product is to be estimated as thermally very stable.

The product contains no branches.

The polyglucans of examples 7 to 9 (samples 283, 291 and 292) are all poly-1,4-α-D-glucans having different mean molecular weights. In the products branching is not detectable. All products also still have small contents of fructose.

Using these polyglucans, RS-containing preparations were produced which have the RS contents and DSC parameters $T_o$, $T_p$, $T_c$ and dH summarized in tables 1 to 3.

TABLE 1

Effect of heat treatment (HT) for one hour under varying moisture contents (moisture: 30 to 57%) at a temperature of 120° C. on the RS content and DSC parameters ($T_o$, $T_p$, $T_c$ and dH) of the RS-containing polyglucan sample 283 ($M_w$ = 21270 g/mol).

| Sample designation | HT conditions Temperature [° C.] | Moisture [%] | RS [%] | To [° C.] | Tp [° C.] | Tc [° C.] | dH [mJ/mg] |
|---|---|---|---|---|---|---|---|
|  | — | — | 65.0 | 91.3 | 110.3 | 121.6 | 15.9 |
|  |  | — | — | — | — | — | — |
|  |  | 10 | — | — | — | — | — |
|  |  | 20 | — | — | — | — | — |
| 283 | 120 | 30 | 71.2 | 109.7 | 122.1 | 131.0 | 7.9 |
|  |  | 40 | 68.2 | 111.0 | 124.2 | 136.0 | 6.9 |
|  |  | 50 | 75.0 | 112.9 | 130.2 | 168.6 | 37.2 |
|  |  | 57 | 70.0 | 116.9 | 134.7 | 168.6 | 24.1 |

TABLE 2

Effect of heat-moisture (HMT) or heat treatment (HT) for one hour under varying process conditions (temperature: 105 to 125° C.; moisture 3 to 57%) on the RS content and DSC parameters ($T_o$, $T_p$, $T_c$ and dH) of the RS-containing polyglucan sample 291 ($M_w$ = 10600 g/mol).

| Sample designation | HT conditions Temperature [° C.] | Moisture [%] | RS [%] | To [° C.] | Tp [° C.] | Tc [° C.] | Dh [mJ/mg] |
|---|---|---|---|---|---|---|---|
|  | — | — | 57.3 | 84.1 | 114.2 | 124.6 | 12.8 |
| 291 | 105 | 3.56 | 74.4 | 85.1 | 115.5 | 131.7 | 16.3 |
|  |  | 10 | 86.5 | 91.7 | 116.5 | 128.2 | 12.4 |
|  |  | 20 | 82.6 | 94.7 | 116.5 | 124.9 | 10.1 |
|  |  | 30 | 68.1 | 98.6 | 116.5 | 127.8 | 15.7 |
|  |  | 40 | 64 | 102.9 | 119.5 | 129.5 | 11.9 |
|  |  | 50 | 59.2 | 111.4 | 121.9 | 131.4 | 10.1 |
|  |  | 57 | 59.7 | — | 124.9 | — |  |
|  | 110 | 3.56 | 82.1 | — | — | — | — |
|  |  | 10 | 85.4 | 90.0 | 115.9 | 125.9 | 10.7 |
|  |  | 20 | 80.6 | 97.7 | 118.5 | 125.4 | 8.1 |
|  |  | 30 | 75.9 | 99.5 | 118.5 | 129.5 | 13.9 |
|  |  | 40 | 66.1 | 106.4 | 122.2 | 131.9 | 10.9 |
|  |  | 50 | 66.6 | 108.4 | 127.6 | 139.2 | 9.0 |
|  |  | 57 | 62.9 | 112.6 | 128.3 | 137.5 | 5.0 |
|  | 115 | 3.56 | 69.5 | 89.2 | 115.9 | 125.5 | 10.8 |
|  |  | 10 | 69.4 | 90.8 | 115.3 | 126.6 | 12.9 |
|  |  | 20 | 76.1 | 98.7 | 117.2 | 129.3 | 16.9 |
|  |  | 30 | 69.3 | 105.5 | 120.6 | 131.0 | 13.9 |
|  |  | 40 | 61.9 | 109.2 | 124.6 | 136.9 | 10.7 |
|  |  | 50 | 58.4 | 112.5 | 129.5 | 137.5 | 3.8 |
|  |  | 57 | 57.9 | 115.7 | 135.0 | 165.6 | 23.1 |
|  | 120 | 3.56 | 77.2 | 89.6 | 114.9 | 124.9 | 9.2 |
|  |  | 10 | 85.8 | 86.5 | 115.5 | 125.6 | 12.8 |
|  |  | 20 | 86.4 | 92.4 | 155.5 | 127.8 | 16.3 |
|  |  | 30 | 69.7 | 105.4 | 121.5 | 132.5 | 11.1 |
|  |  | 40 | 63.0 | 108.5 | 123.0 | 134.7 | 9.7 |
|  |  | 50 | 63.9 | 112.4 | 128.3 | 139.5 | 7.6 |
|  |  | 57 | 59.8 | 111.4 | 129.9 | 145.1 | 12.2 |
|  | 125 | 3.56 | 76.0 | — | — | — | — |
|  |  | 10 | 82.3 | 87.7 | 115.9 | 126.7 | 18.7 |
|  |  | 20 | 72.9 | 100.4 | 119.5 | 133.2 | 18.1 |
|  |  | 30 | 72.0 | 106.0 | 122.9 | 132.1 | 9.8 |
|  |  | 40 | 62.2 | 112.6 | 128.3 | 136.2 | 5.9 |
|  |  | 50 | 59.1 | 115.0 | 135.3 | 162.2 | 27.4 |
|  |  | 57 | 53.5 | 117.5 | 136.7 | 163.2 | 23.7 |

TABLE 3

Effect of heat-moisture (HMT) or heat treatment for one hour under varying process conditions (temperature: 105 to 125° C.; moisture 3 to 57%) on the RS content and DSC parameters ($T_o$, $T_p$, $T_c$ and dH) of the RS-containing polyglucan sample 292 (Mw = 8 300 g/mol).

| Sample designation | HT conditions Temperature [° C.] | Moisture [%] | RS [%] | To [° C.] | Tp [° C.] | Tc [° C.] | dH [mJ/mg] |
|---|---|---|---|---|---|---|---|
|  | — | — | 58.8 | 76.0 | 106.1 | 123.4 | 14.6 |
| 292 | 105 | 4.13 | 60.7 | — | — | — | — |
|  |  | 10 | 73.4 | — | — | — | — |
|  |  | 20 | 75.3 | 84.7 | 111.5 | 121.6 | 9.8 |
|  |  | 30 | 75.9 | 90.9 | 116.2 | 121.1 | 7.2 |
|  |  | 40 | 72.9 | 96.5 | 120.5 | 138.3 | 19.1 |
|  |  | 50 | 65.3 | 102.5 | 121.6 | 132.7 | 9.3 |
|  |  | 57 | 58.4 | 100.7 | 125.3 | 139.5 | 18.0 |
|  | 110 | 4.13 | 73.2 | — | — | — | — |
|  |  | 10 | 84.9 | — | — | — | — |
|  |  | 20 | 80.5 | — | — | — | — |
|  |  | 30 | 77.0 | 91.2 | 115.9 | 133.7 | 17.3 |
|  |  | 40 | 69.2 | 98.1 | 121.2 | 143.7 | 16.8 |

TABLE 3-continued

Effect of heat-moisture (HMT) or heat treatment for one hour under varying process conditions (temperature: 105 to 125° C.; moisture 3 to 57%) on the RS content and DSC parameters ($T_o$, $T_p$, $T_c$ and dH) of the RS-containing polyglucan sample 292 (Mw = 8 300 g/mol).

| Sample designation | HT conditions Temperature [° C.] | Moisture [%] | RS [%] | DSC parameters To [° C.] | Tp [° C.] | Tc [° C.] | dH [mJ/mg] |
|---|---|---|---|---|---|---|---|
| | | 50 | 60.9 | 105.7 | 127.6 | 138.7 | 8.6 |
| | | 57 | 64.4 | 105.8 | 125.6 | 144.1 | 18.9 |
| | 115 | 4.13 | 69.4 | 108.8 | 112.4 | 122.3 | 0.7 |
| | | 10 | 77.5 | 107.4 | 114.5 | 125.5 | 1.4 |
| | | 20 | 85.1 | 88.1 | 107.1 | 125.3 | 10.6 |
| | | 30 | 76.2 | 91.5 | 116.2 | 131.5 | 17.0 |
| | | 40 | 68.4 | 98.0 | 119.5 | 136.6 | 16.3 |
| | | 50 | 66.0 | 103.5 | 105.4 | 108.3 | 0.8 |
| | | | | 111.0 | 122.9 | 131.8 | 4.3 |
| | | 57 | 63.4 | 107.8 | 127.6 | 136.7 | 6.1 |
| | | | | 143.4 | 161.2 | 174.7 | 7.4 |
| | 120 | 4.13 | 76.7 | 78.1 | 105.8 | 129.0 | 11.4 |
| | | 10 | 87.6 | 82.5 | 109.1 | 130.1 | 16.0 |
| | | 20 | 83.2 | 89.4 | 114.9 | 130.5 | 17.2 |
| | | 30 | 72.4 | 99.5 | 120.2 | 142.7 | 18.8 |
| | | 40 | 66.3 | 104.3 | 126.3 | 144.6 | 17.1 |
| | | 50 | 64.7 | 106.7 | 131.3 | 148.5 | 14.8 |
| | | 57 | 54.6 | 110.1 | 131.6 | 146.2 | 10.1 |
| | 125 | 4.13 | 77.0 | — | — | — | — |
| | | 10 | 83.8 | — | — | — | — |
| | | 20 | 87.8 | 90.8 | 118.5 | 134.1 | 20.7 |
| | | 30 | 76.3 | 99.4 | 124.6 | 144.5 | 18.6 |
| | | 40 | 67.9 | 103.4 | 130.6 | 149.2 | 18.2 |
| | | 50 | 63.7 | 108.9 | 131.3 | 150.0 | 16.7 |
| | | 57 | 57.3 | 108.0 | 132.9 | 144.1 | 9.4 |

What is claimed is:

1. A process for increasing the α-amylase resistant starch content of a polysaccharide, comprising the steps of:
    incubating a polysaccharide and water mixture, the mixture comprising less than about 35% water by total weight of the mixture; and
    cooling said polysaccharide.

2. The process of claim 1, further comprising the step of recovering an increased α-amylase resistant starch content polysaccharide.

3. The process of claim 1, wherein said process is performed more than once.

4. The process of claim 1, wherein said incubation step is performed at a varying temperature range wherein the temperature of the process is higher than the glass transition temperature.

5. The process of claim 4, wherein said temperature of the process is a temperature that is lower than a differential scanning calorimetry end temperature.

6. The process of claim 5, wherein said temperature of the process is lower than a differential scanning calorimetry peak temperature.

7. The process of claim 5, wherein said temperature of the process is lower than a differential scanning calorimetry onset temperature.

8. The process of claim 1, wherein said incubating step is carried out at a varying temperature range where the temperature of the process may be lower than the transformation temperature.

9. The process of claim 8, wherein said transformation temperature is equal to the mean decomposition temperature of said polysaccharide used.

10. The process of claim 8, wherein said transformation temperature is equal to one or more temperatures selected from the group consisting of the differential scanning calorimetry end temperature, the differential scanning calorimetry peak temperature, and the differential scanning calorimetry onset temperature.

11. The process of claim 1, further comprising the step of drying said polysaccharide.

12. The process of claim 11, wherein said drying step is spray-drying.

13. The process of claim 11, wherein said drying step is freeze-drying.

14. The process of claim 1, wherein said polysaccharide comprises poly-(1,4-α-D-glucan).

15. The process of claim 14, wherein said polysaccharide comprises water-insoluble poly-(1,4-α-D-glucan).

16. The process of claim 15, wherein said water-insoluble poly-(1,4-α-D-glucan) is produced by a method selected from the group consisting of biotransformations, reactions with enzymes, and reactions of sucrose with an enzyme having the enzymatic activity of an amylosucrase.

17. The process of claim 15, wherein said water-insoluble poly-(1,4-α-D-glucan) are not debranched.

18. The process of claim 15, wherein said water-insoluble poly-(1,4-α-D-glucan) are not enzymatically debranched.

19. The process of claim 15, wherein the chain length of said water-insoluble poly-(1,4-α-D-glucan) is not decreased by one or more of the group consisting of enzyme catalysis, acid catalysis, extrusion, oxidation and pyrolysis.

20. The process of claim 14, wherein said poly-(1,4-α-D-glucan) is chemically modified.

21. The process of claim 14, wherein said poly-(1,4-α-D-glucan) comprises a maximum degree of branching in the 6 position of about 0.5%.

22. The process of claim 14, wherein said poly-(1,4-α-D-glucan) comprises a maximum degree of branching in the 2 position of about 1.0%.

23. The process of claim 14, wherein said poly-(1,4-α-D-glucan) comprises a maximum degree of branching in the 2 position of about 0.5%.

24. The process of claim 14, wherein the poly-(1,4-α-D-glucan) comprises a maximum degree of branching in the 3 position of about 1.0%.

25. The process of claim 14, wherein the poly-(1,4-α-D-glucan) comprises a maximum degree of branching in the 3 position of about 0.5%.

26. The process of claim 14, wherein said poly-(1,4-α-D-glucan) has a molecular weight of about $0.75 \times 10^2$ to about $1.0 \times 10^7$ g/mol.

27. The process of claim 14, wherein said poly-(1,4-α-D-glucan) has a molecular weight of about $1.0 \times 10^3$ to about $1.0 \times 10^6$ g/mol.

28. The process of claim 14, wherein said poly-(1,4-α-D-glucan) has a molecular weight of about $1.0 \times 10^3$ to about $5 \times 10^6$ g/mol.

29. The process of claim 2, wherein said recovered increased α-amylase-resistant starch content polysaccharide is cold water insoluble.

30. The process of claim 2, wherein said recovered increased α-amylase resistant starch content polysaccharide has a resistant starch content that decreases when the polysaccharide is incubated in a mixture with water, the mixture comprising more than about 50% water by total weight of the mixture.

31. The process of claim 2, wherein said recovered increased α-amylase resistant starch content polysaccharide has a resistant starch content that decreases when the polysaccharide is incubated in a mixture with water, the mixture comprising more than about 35% water by total weight of the mixture.

32. The process of claim 2, wherein said recovered increased α-amylase resistant starch content polysaccharide has a resistant starch content of crystal type A that decreases when the polysaccharide is incubated in a mixture with water, the mixture comprising more than about 50% water by total weight of the mixture.

33. The process of claim 2, wherein said recovered increased α-amylase resistant starch content polysaccharide has a resistant starch content of crystal type A that decreases when the polysaccharide is incubated in a mixture with water, the mixture comprising more than 35% water by total weight of the mixture.

34. A food precursor product comprising the recovered increased α-amylase resistant starch content polysaccharide of claim 2.

35. A food additive product comprising the recovered increased α-amylase resistant starch content polysaccharide of claim 2.

36. A food precursor product, food product, or food additive product comprising the recovered increased α-amylase resistant starch content polysaccharide of claim 2.

* * * * *